United States Patent Office 3,809,759
Patented May 7, 1974

3,809,759
PHARMACEUTICAL COMPOSITION FOR TREATING MENTAL FATIGUE CONTAINING ARGININE-POTASSIUM PHOSPHO CITRO GLUTAMATE AND METHOD OF USING THE SAME
Dominique Bocher, 11 Rue du Moulin Vert, Paris 14e, France, and Robert Faure, 49 Ter, Rue de la Baste, Vaux le Penil, France
No Drawing. Filed Nov. 19, 1970, Ser. No. 91,195
Claims priority, application France, Nov. 21, 1969, 6940125
Int. Cl. A61k 27/00
U.S. Cl. 424—317                                     11 Claims

ABSTRACT OF THE DISCLOSURE

This invention relates to arginine-potassium phospho citro glutamate and its preparation, as well as a pharmaceutical composition containing the same and the use of the latter in the treatment of physical and psychic asthenia.

---

This invention relates to, by way of novel compound, arginine-potassium phospho citro glutamate and a method for preparing the same and its use in the treatment of physical and psychic asthenia.

This compound has the empirical formula $$C_{35}H_{76}O_{23}N_{17}P\text{---}K$$

and can be represented by the following developed formula:

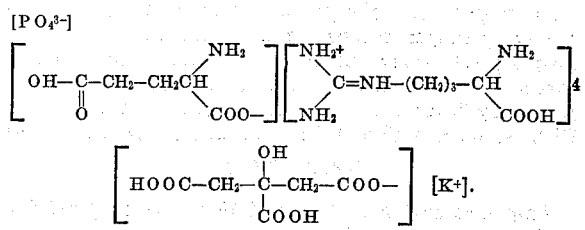

Its molecular weight is 1,172.14 and its percentage composition is as follows:

Percent: C, 35.831; H, 6.535; O, 31.395; N, 20.310; P, 2.640; K, 3.330.

This compound is in the form of a white hygroscopic microcrystalline powder and has a melting point of 163° C. In 10% aqueous solution, it is in the form of a clear solution with a pH of 5.8. The novel compound is insoluble in ethyl alcohol, but is water soluble at a rate of 59.2% by weight.

The present invention is also directed to a process for preparing arginine-potassium phospho citro glutamate which comprises reacting in a first stage phosphoric acid and glutamic acid diluted in water with the base, L-arginine, to produce arginine phospho glutamate.

Separately, potassium monobasic citrate solution is prepared by reacting citric acid with potash.

In the second stage, the potassium monobasic citrate solution is then poured slowly, with vigorous stirring, into the arginine phospho glutamate solution, the temperature of which has been brought to between about 60–65° C. Stirring is continued for twenty minutes at this temperature and the reaction mixture is then permitted to stand for an hour while the temperature thereof returns to ambient temperature.

The cooled solution is then filtered, and the filtrate is concentrated, thereby crystallizing the arginine-potassium phospho citro glutamate.

As a variation of the process of producing the novel compound of this invention the arginine-potassium phospho citro glutamate can be obtained by lyophilization of the above referred to filtrate.

The process of this invention makes it possible to obtain arginine-potassium phospho citro glutamate in the crude state, with a very high yield.

Qualitative identification of the arginine-potassium phospho citro glutamate was performed in the following manner:

(1) Reaction with nitro molybdic acid indicated the presence of the $PO_4^{3-}$ anion in solution. Actually, an absorption band is noted in the infrared at 1050 cm.$^{-1}$, (2) Reaction with Deniges' reagent and potassium permanganate gave a white precipitate which shows the presence of citric acid.

(3) Action of hot ninhydrin on the novel compound of this invention gives an intense blue shade, which establishes the presence of arginine and glutamic acid.

(4) The mauve coloring of flame test shows the presence of potassium.

The arginine-potassium phospho citro glutamate of this invention presents to ultraviolet, in 1% solution, a maximum absorption at 224 m$\mu$, the light intensity transmitted being 1.4%.

Quantitative identification of the arginine-potassium phospho citro glutamate was performed by the following determinations:

(1) Determination of arginine was performed by colorimetry in the presence of oxine and hypobromite in an alkaline medium. The coloring was stabilized by urea which destroys the excess hypobromite. This determination gives a percentage of arginine corresponding to theory, namely, 59.40%.

(2) Determination of glutamic acid was performed by transformation into the corresponding hydroxanic acid by sodium nitrite and hydrolasamine, followed by colorimetric determination in the presence of ferric chloride. This determination gives a percentage of glutamic acid corresponding to theory, namely, 12.55%.

(3) Determination of phosphorus was performed by phosphomolybdic acid reaction and acidimetric titration by soda after dissolving in hydrochloric acid. This determination yields a percentage of phosphorus corresponding to theory, namely, 8.34%.

(4) Determination of citric acid was performed by transformation into betacetoglutaric acid and gravimetry. This determination gives a percentage of citric acid corresponding to theory, namely, 16.39%.

(5) Determination of potassium was performed by flame photometry. This determination gave a percentage of potassium corresponding to theory, namely, 3.32%.

Over-all determination of the nitrogen content was performed by the "Codex" method ($N_2$ being collected in the form of $NH_3$, then titrated by sulfuric acid). This determination yields a total percentage of nitrogen corresponding to theory, namely, 20.31%.

The following exemplifies a method of preparing arginine-potassium phospho citro glutamate according to the present invention.

PROCESS OF PREPARING ARGININE-POTASSIUM PHOSPHO CITRO GLUTAMATE

To obtain 50 kg., or 43 moles of arginine-potassium phospho citro glutamate, an arginine phospho glutamate solution is prepared in a first stage by mixing together 29.928 kg. of pure L-arginine, 6.321 kg. of pure glutamic acid, 4.950 kg. of 85% phosphoric acid and 150 liters of purified water.

To this resulting solution of arginine phospho glutamate there is added in a second stage with vigorous stirring and at a temperature between about 60 and 65° C., a solution of potassium citrate which is prepared by dissolving 9.036 kg. of monohydrated citric acid and 2.832 kg. of 85% potash, in pellet form, in 18 liters of purified water.

After the potassium citrate has been added, stirring is continued for twenty minutes while maintaining the temperature at about 60–65° C. Then stirring is discontinued and the solution is allowed to stand for about an hour so that the temperature returns to ambient temperature. The pH of the resulting solution is then about 6. Thereafter, the solution is filtered and the filtrate is concentrated, thereby crystallizing the arginine-potassium phospho citro glutamate.

The arginine-potassium phospho citro glutamate can advantageously be recrystallized in water and when obtained as described above it is present in the form of a white microcrystalline powder having a melting point of 162–163° C.

By determination according to the Karl Fischer method it presents a moisture rate of 5%.

The present invention also has for its object a pharmaceutical composition containing the arginine-potassium phospho citro glutamate of this invention in a suitable pharmaceutical excipient.

Heretofore, it has been known that certain arginine salts have been proposed for therapeutic use. For example, arginine phosphate and arginine citrate have been employed in therapeutic compositions.

As has been clearly indicated above, the arginine-potassium phospho citro glutamate according to the present invention is not a simple association of the principal agents already known, but as the potential balance of its formula proves, a new molecule having its own physical and chemical properties, and quite exact therapeutic indications.

The arginine-potassium phospho citro glutamate according to the invention is recommended more particularly for its refreshing and energy action, both in human and animal therapeutics.

Pharmacological studies made on rats and guinea pigs have made it possible to show the properties of arginine-potassium phospho citro glutamate. These properties are essentially characterized by a strong hepato-protective power, by an action on the nervous system, and by an action of resistance to muscular fatigue.

The arginine-potassium phospho citro glutamate according to the invention therefore presents a general tonic action, exhibiting in itself alone the following properties:

(1) In relation to standard anabolizers, it cumulates the energy action of its constituents which mutually reinforce each other;
(2) By its reconstituting properties, it has a fast and lasting anti-asthenic action;
(3) By its dynamogenic properties, it increases the resistance of the organism to fatigue, aggressions and infections;
(4) By its pshyco-detoxicating properties, it improves the memory and intellectual output without causing psychic excitation;
(5) By its psycho-energetic properties, it makes possible a psychic improvement and promotes sleep, physical and intellectual effort, by its action on cerebral metabolism; and
(6) It further makes possible a rapid neutralization of nitrogen metabolic wastes, reducing ammoniemia and facilitating hepatic synthesis of urea.

In the toxicological study conducted on rats, guinea pigs and rabbits (acute, subacute and chronic toxicity) it has been concluded that the arginine-potassium phospho citro glutamate of this invention is essentially non-toxic.

The compositions according to the invention generally contain from 0.05 to 80 weight percent arginine-potassium phospho citro glutamate, the remainder being essentially the pharmaceutically acceptable or ingestible carrier.

These compositions according to the invention can be present in the form of a liquid or a solid. When in the liquid form the active compound is present in solution in a liquid carrier such as an aqueous solution having a fragrant or pleasing aroma. The aqueous solution generally contains about 5–40 weight percent of the arginine-potassium phospho citro glutamate. When in solid form, such as in the form of granules, pills, tablets, boluses or capsules, such ingestible solid compositions generally contain, per unit, between 50 mg. and 1 g. of active compound. Representative excipients, which make it possible to achieve solid ingestible compositions containing the active compound, are those conventionally used for similar types of composition. Examples of such excipients are described, for instance, in U.S. Pat. 2,888,380.

The present invention also has for its object a process of treating physical and psychic asthenia which comprises administering orally a pharmaceutical composition containing arginine-potassium phospho citro glutamate in an ingestible or pharmaceutical excipient.

The period of treatment is generally between ten and forty-five days, with daily doses of the order of 0.5 to 5 g., taking account of the non-toxicity of said arginine-potassium phospho citro glutamate. Adult doses are generally between 2 and 5 g. while children's doses are normally between 0.05 g. and 2 g.

The activity of the arginine-potassium phospho citro glutamate has been further demonstrated by considerable clinical testing on humans. This clinical study has made it possible to demonstrate the therapeutic action of arginine-potassium phospho citro glutamate in the case of physical and psychic asthenia, convalescence, slowness in school and mental fatigue.

The following pharmaceutical compositions are given to illustrate the present invention:

EXAMPLE 1

A syrup is made for children by preparing the following mixture:

| | |
|---|---|
| Arginine-potassium phospho citro glutamate___g__ | 10 |
| Methyl parahydroxybenzoate _____g__ | 0.125 |
| Propyl parahydroxybenzoate _____g__ | 0.125 |
| Syrup _____ml__ | 70 |
| Raspberry flavor _____ml__ | 4 |
| Distilled water sufficient for _____ml__ | 100 |

EXAMPLE 2

Ampoules having a volume of 10 cc. are prepared for adults by making the following mixtures:

| | |
|---|---|
| Arginine-potassium phospho citro glutamate __g__ | 2 |
| Sucrose _____g__ | 3 |
| Honey scent _____g__ | 1.10 |
| Caramel scent _____g__ | 0.30 |
| Distilled water _____ml__ | 10 |

EXAMPLE 3

Tablets are prepared by making the following mixture:

| | G. |
|---|---|
| Arginine-potassium phospho citro glutamate ____ | 0.500 |
| Lactose sufficient for _____ | 0.660 |

EXAMPLE 4

Tablets are prepared by making the following mixture:

| | G. |
|---|---|
| Arginine-potassium phospho citro glutamate ____ | 0.500 |
| Honey scent _____ | 0.025 |
| Caramel scent _____ | 0.075 |
| Crystallized white sugar _____ | 2.200 |
| Tragacanth mucilage _____ | 0.200 |

What is claimed is:
1. A pharmaceutical composition for treating mental fatigue comprising a pharmaceutical excipient and arginine-potassium phospho citro glutamate present in an amount effective to treat said mental fatigue, said amount ranging between about 0.05 to 80 percent by weight of said composition.
2. The composition of claim 1 in liquid form.

3. The composition of claim 2 containing between 5 and 40 weight percent arginine-potassium citro glutamate.

4. The composition of claim 1 in solid form.

5. The composition of claim 4 containing said arginine-potassium phospho citro glutamate in amounts ranging between 5 and 1,000 mg. per unit.

6. The composition of claim 4 in the form of granules.

7. The composition of claim 4 in the form of pills.

8. The composition of claim 4 in the form of tablets.

9. The composition of claim 4 in the form of capsules.

10. A process for treating mental fatigue comprising orally administering to a human in an amount effective to treat said mental fatigue, said amount ranging from about 0.5–5 g. per day of arginine-potassium phospho citro glutamate in an ingestible pharmaceutical excipient.

11. The process of claim 10 wherein said arginine-potassium phospho citro glutamate is administered for a period ranging between 10 and 45 days.

References Cited
UNITED STATES PATENTS
2,888,380   5/1959   Brown et al. _____ 424—37

VINCENT D. TURNER, Primary Examiner

U.S. Cl. X.R.

260—534 E